United States Patent
Dayal et al.

(10) Patent No.: US 10,608,468 B2
(45) Date of Patent: Mar. 31, 2020

(54) WIRELESS CHARGING SYSTEMS WITH IN-BAND COMMUNICATIONS

(71) Applicant: Apple Inc., Cupertino, CA (US)

(72) Inventors: Rohan Dayal, Mountain View, CA (US); Weihong Qiu, San Ramon, CA (US); Zaki Moussaoui, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 157 days.

(21) Appl. No.: 15/611,622

(22) Filed: Jun. 1, 2017

(65) Prior Publication Data
US 2017/0373537 A1 Dec. 28, 2017

Related U.S. Application Data

(60) Provisional application No. 62/355,707, filed on Jun. 28, 2016.

(51) Int. Cl.
*H02J 50/10* (2016.01)
*H02J 50/80* (2016.01)
(Continued)

(52) U.S. Cl.
CPC ............ *H02J 50/10* (2016.02); *H02J 7/025* (2013.01); *H02J 50/80* (2016.02); *H04B 1/3827* (2013.01)

(58) Field of Classification Search
CPC ............ H02J 7/025; H02J 7/02; H04B 1/3827
See application file for complete search history.

(56) References Cited

U.S. PATENT DOCUMENTS 8,933,583 B2    1/2015   Uchida
2006/0248952 A1*  11/2006  Jarvie ................. G01F 23/2963
                                                           73/444
(Continued)

FOREIGN PATENT DOCUMENTS

EP    2851017 A1    3/2015
JP    2011-172299   9/2011

OTHER PUBLICATIONS

Donovan et al., Universally Compatible Wireless Power Using the Qi Protocol, The Engineer's Portal to Green Design, Off-Chip Communications LLC, 11 pages.

*Primary Examiner* — Jared Fureman
*Assistant Examiner* — Emmanuel Dominique
(74) *Attorney, Agent, or Firm* — Treyz Law Group; George Victor Treyz; Jason Tsai

(57) ABSTRACT

A wireless power transmitting device may have control circuitry that supplies drive signals to a coil to produce wireless power signals. The wireless power receiving device may have a coil that receives the transmitted wireless power signals from the wireless power transmitting device. The wireless power receiving device may have a rectifier that rectifies signals received by the coil in the wireless power receiving device and that provides a rectified voltage to a capacitor. A charger in the wireless power receiving device may charge a battery in the device using the rectified voltage. When it is desired to convey information to the wireless power transmitting device, the wireless power transmitting device may cease the transmission of wireless power and the wireless power receiving device may modulate transistors in the rectifier to transmit data to the wireless power transmitting device.

23 Claims, 5 Drawing Sheets

(51) Int. Cl.
*H02J 7/02* (2016.01)
*H04B 1/3827* (2015.01)

(56) References Cited

U.S. PATENT DOCUMENTS

| | | | |
|---|---|---|---|
| 2010/0237709 A1* | 9/2010 | Hall | B60L 11/182 |
| | | | 307/104 |
| 2011/0022113 A1* | 1/2011 | Zdeblick | A61B 5/0402 |
| | | | 607/30 |
| 2011/0121920 A1* | 5/2011 | Kurs | H02J 17/00 |
| | | | 333/219.2 |
| 2011/0163608 A1* | 7/2011 | Brohlin | H02J 5/005 |
| | | | 307/104 |
| 2013/0076153 A1 | 3/2013 | Murayama et al. | |
| 2013/0221911 A1* | 8/2013 | Low | H02J 5/005 |
| | | | 320/108 |
| 2013/0235632 A1* | 9/2013 | Knoedgen | H02M 7/06 |
| | | | 363/126 |
| 2014/0265610 A1 | 9/2014 | Bakker et al. | |
| 2015/0002081 A1 | 1/2015 | Lohr | |
| 2015/0032177 A1* | 1/2015 | Mashiach | A61N 1/3787 |
| | | | 607/42 |
| 2015/0115735 A1* | 4/2015 | Singh | H04B 5/0037 |
| | | | 307/104 |
| 2015/0207333 A1* | 7/2015 | Baarman | H02J 5/005 |
| | | | 307/104 |
| 2015/0271673 A1 | 9/2015 | Lord et al. | |
| 2015/0341085 A1* | 11/2015 | Ettes | H04B 5/0031 |
| | | | 307/104 |
| 2015/0380976 A1* | 12/2015 | Heo | H02J 7/027 |
| | | | 455/573 |
| 2016/0020643 A1* | 1/2016 | Abe | H02J 50/12 |
| | | | 320/108 |
| 2016/0226296 A1* | 8/2016 | Bae | H02J 5/00 |
| 2016/0241086 A1* | 8/2016 | Jung | H02J 50/80 |
| 2018/0048188 A1* | 2/2018 | Karalis | B60L 53/12 |
| 2018/0131234 A1* | 5/2018 | Uchimoto | H04B 5/0031 |
| 2018/0323828 A1* | 11/2018 | Hwang | H02J 50/12 |

* cited by examiner

WIRELESS CHARGING SYSTEMS WITH IN-BAND COMMUNICATIONS

This application claims the benefit of provisional patent application No. 62/355,707, filed Jun. 28, 2016, which is hereby incorporated by reference herein in its entirety.

FIELD

This relates generally to charging systems, and, more particularly, to systems for charging electronic devices.

BACKGROUND

In a wireless charging system, a wireless power adapter may use a coil to wirelessly transmit power to a wireless power receiving device. The wireless power receiving device may have a coil and a rectifier. The coil receives wirelessly transmitted power signals from the wireless power adapter. The rectifier converts the received signals into direct-current (DC) power.

It may sometimes be desirable to transmit data from a wireless power receiving device to a wireless power adapter. So-called in-band communications schemes have been developed that allow wireless power receiving devices to communicate with wireless power devices. In a typical in-band communications scheme, a switching circuit that is coupled to the coil in the receiving device is used to modulate the load across the coil. The wireless power adapter can detect the modulated signal using a voltage sensing circuit coupled to a coil in the wireless power adapter.

In-band communications schemes that are based on this type of load modulation may not always be reliable. For example, if electromagnetic coupling between the wireless power adapter and the wireless power receiving device is poor, the voltage sensing circuit in the wireless power adapter may not be able to detect the modulated signal from the wireless power receiving device.

SUMMARY

A system is provided in which a wireless power transmitting device may transmit power wirelessly to a wireless power receiving device. The wireless power transmitting device may have control circuitry that supplies drive signals to a coil to produce wireless power signals. The wireless power receiving device may have a coil that receives the transmitted wireless power signals from the wireless power transmitting device. The wireless power transmitting device and the wireless power receiving device may communicate wirelessly using the same coils that are used in transmitting and receiving wireless power.

The wireless power receiving device may have a rectifier that rectifies signals received by the coil in the wireless power receiving device and that provides a corresponding rectified voltage to a capacitor. A charger in the wireless power receiving device may charge a battery in the device using the rectified voltage. When it is desired to convey information to the wireless power transmitting device, the wireless power transmitting device may pause transmission of wireless power and the wireless power receiving device may modulate transistors in the rectifier, thereby transmitting data in band to wireless power transmitting device.

DETAILED DESCRIPTION

A wireless power system may have a power transmitting device such as a wireless power adapter or other equipment. The wireless power transmitting device may wirelessly transmit power to a wireless power receiving device such as a wristwatch, cellular telephone, tablet computer, laptop computer, or other electronic equipment. The wireless power receiving device may use power from the wireless power adapter for powering control circuitry and for charging an internal battery.

Figure 1:
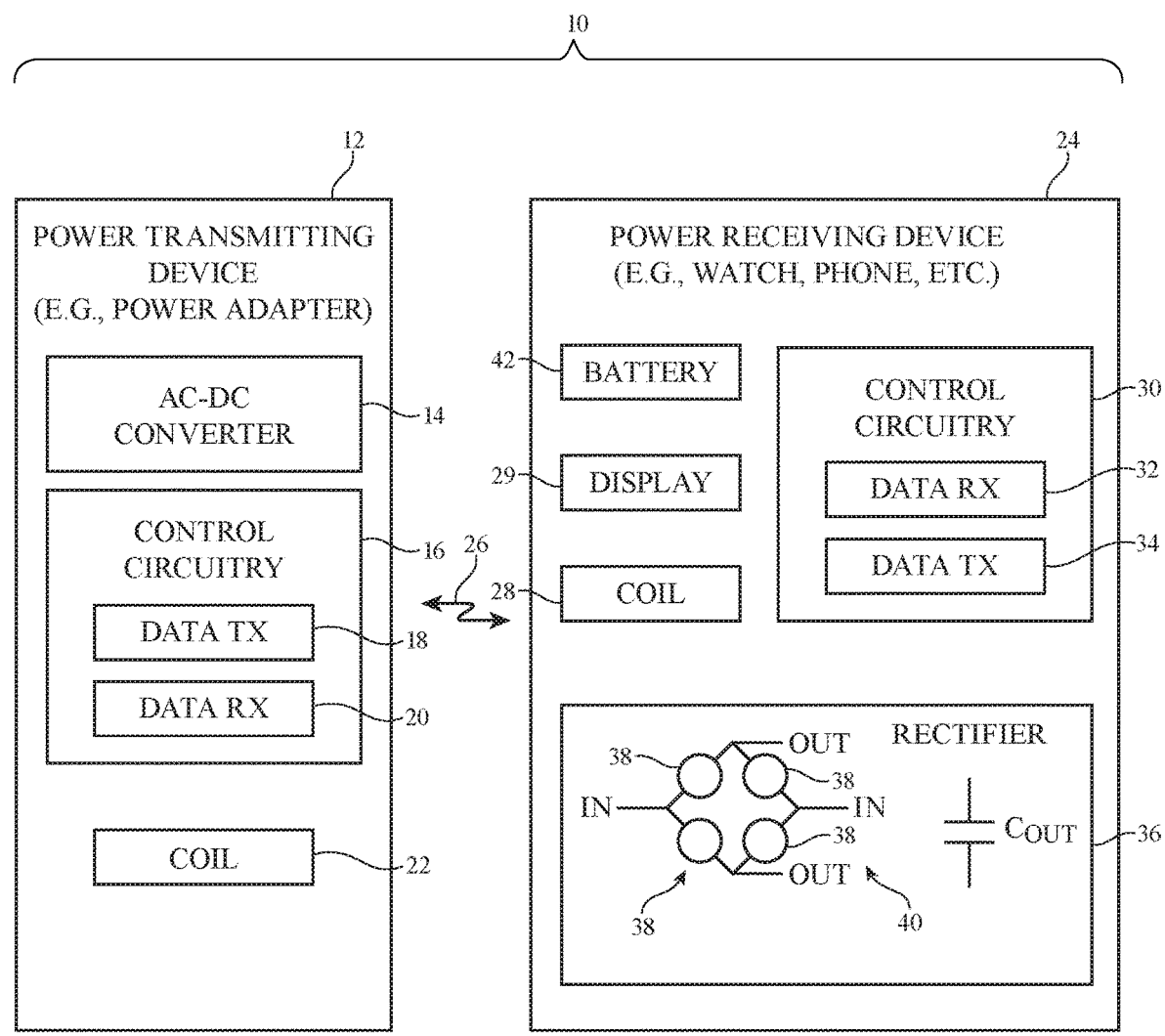
FIG. 1 is a schematic diagram of an illustrative wireless charging system that includes a wireless power adapter and an electronic device that receives power from the power adapter in accordance with an embodiment.

An illustrative wireless power system (wireless charging system) is shown in FIG. 1. As shown in FIG. 1, wireless power system 10 may include a wireless power transmitting device such as wireless power transmitting device 12 and may include a wireless power receiving device such as wireless power receiving device 24.

Power transmitting device 12 may be a stand-alone power adapter, may be a wireless charging mat that is coupled to a power adapter or other equipment by a cable, may be a portable device, may be equipment that has been incorporated into furniture, a vehicle, or other system, or may be other wireless power transfer equipment. Illustrative configurations in which wireless power transmitting device 12 is a power adapter may sometimes be described herein as an example.

Power receiving device 24 may be a portable electronic device such as a wristwatch, a cellular telephone, a laptop computer, a tablet computer, or other electronic equipment. Power transmitting device 12 may be coupled to a wall outlet or other source of alternating-current (AC) power and/or may have a battery for supplying power. Power transmitting device 12 may have an AC-DC power converter such as power converter 14 for converting AC power from a wall outlet or other power source into DC power. DC power may be used to power control circuitry 16. During operation, a controller in control circuitry 16 may turn on and off switching circuitry (e.g., transistors) to create AC signals through coil 22. As the AC signals pass through coil 22, electromagnetic signals 26 are produced that are received by corresponding coil 28 in power receiving device 24. When it is desired to transmit data from device 12 to device 24, data transmitter circuitry 18 may be used in modulating the signals that are supplied to coil 22 using a modulation scheme such as a frequency-shift keying (FSK) modulation scheme. Control circuitry 30 of power receiving device 24 may use a data receiver circuit such as data receiver circuit 32 to demodulate the modulated signal pulses from transmitter 18 (e.g., circuit 32 can demodulate the FSK signals from circuit 18). When it is desired to transmit data from device 24 to device 12, data transmitter circuit 34 of device 24 may be used in producing signals that are transmitted by coil 28 to coil 22 of device 12 and that are demodulated by data receiver 20 of device 12.

During power transmission operations, coil 28 supplies received AC power signals to rectifier 36. Rectifier 36 contains rectifying circuitry such as bridge circuit 40. Bridge circuit 40 has rectifying components such as synchronous rectification metal-oxide-semiconductor transistors 38 arranged in a bridge network between input terminals IN and output terminals OUT. The bridge network may have any suitable number of transistors 38 (e.g., two transistors 38, four transistors 38, etc.). The configuration of FIG. 1 is illustrative.

Input terminals IN may receive AC power signals from coil 28. Transistors 38 may be turned on and off by control circuitry 30 in synchronization with the AC power signals from coil 28 to rectify the AC power signals (e.g., transistors 38 of bridge circuit 40 and rectifier 36 may be operated using a synchronous rectification scheme to produce rectified signals at output OUT). A capacitor and a charger circuit may be coupled to output OUT and may be used to store received power, to smooth out signal ripples, and to provide power to a battery in device 24.

Device 24 may include display 29 for displaying images to a user of device 24 and may contain other input-output devices such as sensors (e.g., force sensors, touch sensors, light-based proximity sensors, capacitance-based proximity sensors, capacitive touch sensors, force sensors, magnetic sensors, gyroscopes, accelerometers, gas pressure sensors, temperature sensors, ambient light sensors, image sensors, etc.), may include buttons, keypads, trackpads, and other input devices, may include audio components, status-indicator lights, and/or other electrical components.

When it is desired to transmit data from device 24 to device 12, device 12 may cease (stop) transmission of power. Power transmission may be stopped for a relatively short amount of time (e.g., 5-50 ms) or other suitable period of time. During this time, any components in device 24 that have been powered up and are active (e.g., a display such as display 29 that is displaying images to a user, an audio device that is presenting audio to the user, etc.) may continue to operate without interruption, because the smoothing capacitor (e.g., capacitor Cout) in rectifier 36 and/or the battery in device 24 (e.g., battery 42) are able to supply power to these components even in the absence of received wireless power from device 12. As a result, a user's interaction with device 24 will not be disrupted. When device 24 is displaying a battery charging indicator on display 29, the battery charging indicator would also ignore the brief stoppage of incoming wireless power. For example, the battery charging indicator forgoes briefly transitioning from an indication of charging, to non-charging, and back to charging operation. These aspects allow data to be transmitted from device 24 to device 12 periodically (e.g., to provide real-time feedback on charging parameters, etc.) without perceptible interruption to the user's interaction with device 24. Data may also be transmitted from device 24 to device 12 upon initially transmitting power from device 12 to device 24 (e.g., to provide a device identifier from device 24 to device 12, etc.).

While device 12 is not transmitting wireless power to device 24, data transmitter circuit 34 of device 24 may modulate transistors 38 in rectifier 36, thereby creating wireless signals that are transmitted from coil 28 to coil 22 of device 12. Because data signals are conveyed wirelessly from device 24 to device 12 using coils 22 and 28, this type of data communications between device 24 and device 12 may sometimes be referred to as in-band communications. Device 12 may use data receiver 20 to demodulate the wireless signals from device 24 and thereby receive the data transmitted from device 24. The transmitted data may be used to authenticate device 24 to device 12, may be used to supply feedback or other control signals to device 12, or may be used to convey other information.

When device 12 is in power transmission mode, control circuitry 16 may use a pulse-width modulation (PWM) scheme to modulate the AC drive signals that are being supplied to the output transistors coupled to coil 22 and thereby adjust how much power is being supplied to device 24. Output transistors in the power transmission portion of control circuitry 16 may, for example, be modulated at an AC frequency of about 200 kHz (or other suitable frequency above or below 200 kHz such as a frequency of 100 kHz-300 kHz, at least 100 kHz, less than 300 kHz, etc.) to create an AC signal to drive coil 22. As this AC signal passes through coil 22, a corresponding wireless power signal (electromagnetic signal 26) is created and conveyed to coil 28 of device 24. The duty cycle of the PWM AC drive signals may, if desired, be adjusted based on power transmission feedback information that is conveyed in band from data transmitter 34 to data receiver 20. For example, device 12 can use information that has been transmitted back from device 24 to device 12 to increase or decrease the amount of transmitted power that device 12 is providing to device 24.

Figure 2:
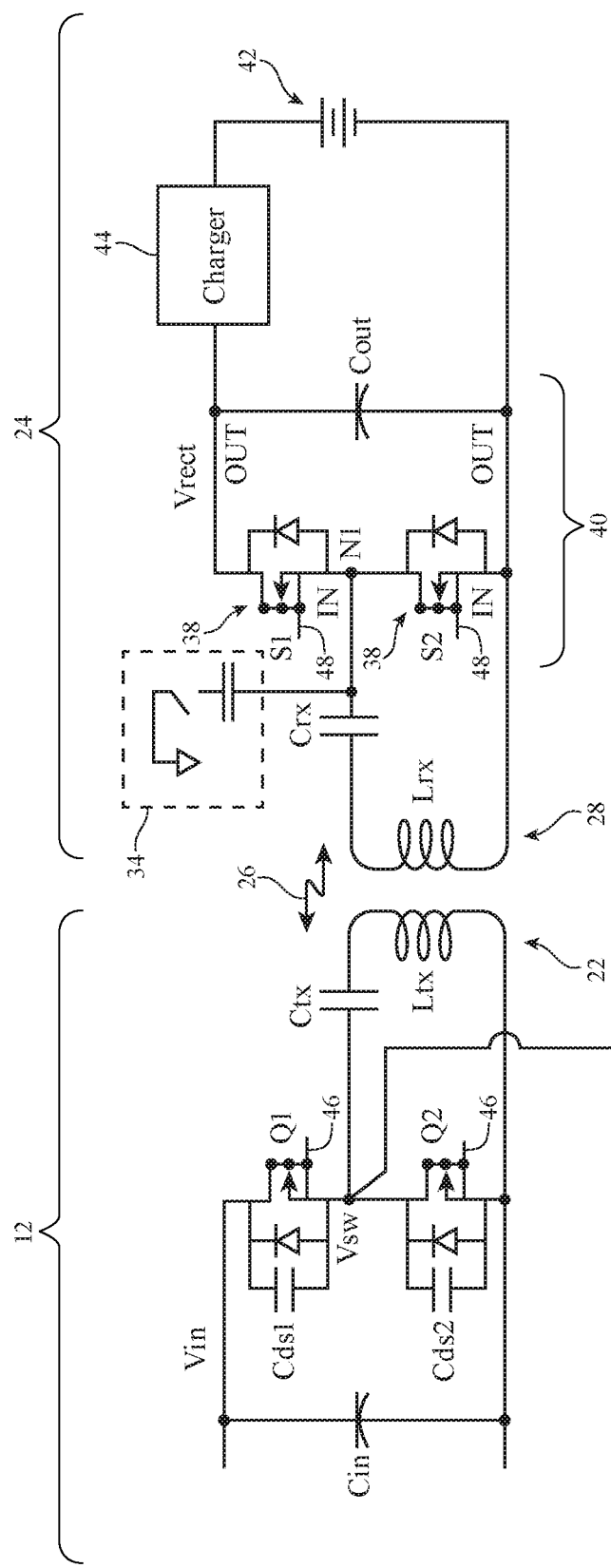
FIG. 2 is a circuit diagram of illustrative devices in a system of the type shown in FIG. 1 in accordance with an embodiment.

FIG. 2 is a circuit diagram showing illustrative circuitry that may be used for a wireless power transmitting device and wireless power receiving device in system 10. As shown in FIG. 2, wireless power transmitting device 12 may receive a DC voltage Vin across capacitor Cin from AC-DC converter 14 (FIG. 1). Control circuitry 16 may produce control signals that are applied to gates 46 of transistors Q1 and Q2. Gates 46 of transistors Q1 and Q2 may receive complementary signals so that the gate of Q1 is high when the gate of Q2 is low and vice versa. With one illustrative configuration, transistors Q1 and Q2 may be supplied with an AC signal at 200 kHz or other suitable frequency (e.g., at least 100 kHz, less than 300 kHz, etc.) that is modulated using pulse width modulation. Other suitable control signals may be applied to Q1 and Q2, if desired. Transistors Q1 and Q2 may be characterized by an internal diode and drain-source capacitance (see, e.g., capacitances Cds1 and Cds2), as shown schematically in FIG. 2.

Transistors Q1 and Q2 are coupled in series between a positive voltage terminal (at power supply voltage Vin) and a ground power supply terminal. Coil 22 has a first terminal coupled to ground and a second terminal coupled by capacitor Ctx to a node between Q1 and Q2 at voltage Vsw. As the control signals are applied to gates 46 of output transistors Q1 and Q2, the DC voltage Vin is converted into an AC current that passes through capacitor Ctx and coil 22 (of inductance Ltx). This produces corresponding wireless signal 26, which is transmitted to device 24 and received by coil 28 (of inductance Lrx) in device 24.

The received AC signal from coil 28 is conveyed through capacitor Crx to bridge circuit 40 of rectifier 36. The transistors S1 and S2 of rectifier 36 may be operated in synchronous rectifier mode to rectify the received signal and thereby produce rectified DC signal (voltage) Vrect across capacitor Cout. In synchronous rectifier operation, control circuitry 30 senses the voltage at the drain of each transistor and uses the sense voltage as a trigger signal to actively turn on each transistor when appropriate. Synchronous rectifier operation may enhance rectification efficiency by eliminating power losses due to diode turn on voltages.

Capacitor Cout may hold the voltage Vrect that is generated by bridge circuit 40 of rectifier 36 across output terminals OUT. During normal operation, charger 44 can use the DC voltage Vrect to charge battery 42 and to supply power to system circuitry in device 24.

When it is desired to transmit data from device 24 to device 12, data transmitter 34 of control circuitry 30 (e.g., a switch coupled to ground and coupled by a capacitor to node N1 or other suitable transmitter circuitry) may be modulated in accordance with the data being transmitted. For example, the switch in transmitter 34 may be pulsed one or more times for each transmitted data bit (e.g., for each "one" bit being transmitted from device 24 to device 12). The presence of a predetermined number of pulses (e.g., one pulse, two pulse, three pulses, etc.) may correspond to a "one bit" and the absence of this number of pulses from transmitter 34 in the transmitted data stream may correspond to "zero" bits (as an example). Each pulse from transmitter 34 may be sufficiently short to induce signal ringing in coil 22. For example, transmitter 34 may generate pulses of 1 microsecond in duration, pulses that are at least 0.1 ms long, pulses that are shorter than 10 ms, and/or other suitable pulses. Control circuitry 16 of device 12 may pause power transmission operations during the transmission of in-band data from device 24 to device 12 and may use data receiver 20 to receive the transmitted data from transmitter 34 (e.g., signals that are conveyed wirelessly from coil 28 to coil 22 via electromagnetic signals).

Figure 3:
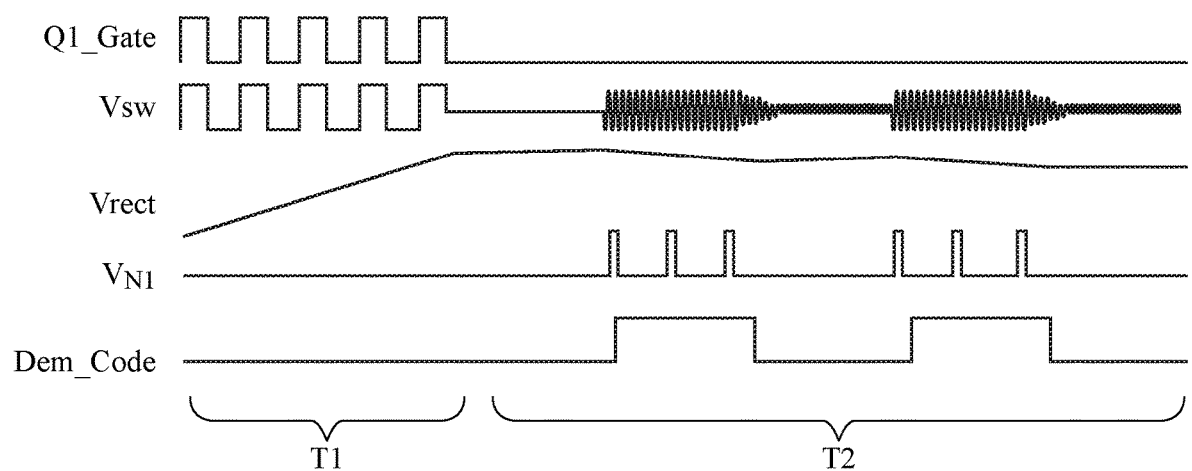
FIG. 3 is a graph showing signals associated with operating a wireless charging system in accordance with an embodiment.

Any suitable modulation scheme may be used to support transmission of data to device 12. With one illustrative configuration, transmitter 34 may transmit data to device 12 by applying sets of one or more drive signal pulses to the switch of transmitter 34 to coupled node N1 to ground (e.g., through the capacitor in transmitter circuit 34). Each time control circuitry 30 applies one of these signal pulses to coil 28, coil 28 will via electromagnetic coupling as signal 26 create a corresponding pulse in the current through coil 22 and due to the network of Ctx and Ltx and Cds2, current through coil 22 will ring and Vsw will ring as shown in FIG. 3. Using this arrangement, data may be transmitted from device 24 to device 12 in binary (one bits and zero bits). One bits may be represented by sets of one or more pulses (e.g., microsecond pulses) applied to coil 28 by data transmitter 34 using transistors S1 and S2, by using a switch (e.g., a transistor) coupled to ground, or using other transmitter circuitry. Zero bits may be represented by the absence of these pulses in the transmitted binary data. Data receiver 20 may use a voltage sensor to monitor the voltage Vsw across capacitor Ctx, which corresponds to the received version of the transmitted signal. By monitoring voltage Vsw, receiver 20 may receive the data transmitted by data transmitter 34.

If desired, data may also be transmitted from device 12 to device 24. For example, the PWM signal that is applied to transistors Q1 and Q2 may be modulated by transmitter 18 using a modulation scheme such as frequency shift keying (FSK) or other suitable modulation scheme. Data receiver 32 may have a detector circuit that is coupled across capacitor Crx to detect the modulated data signal from transmitter 18. Data transmission from device 12 to device 24 may take place during power transmission from device 12 to device 24. During data transmission from device 24 to device 12, coil 22 may be used to receive data rather than to wirelessly transmit power.

FIG. 3 is a graph showing signals involved in using device 12 to transmit power to device 24 (during period T1) and in using device 24 to transmit data to device 12 (during period T2). During period T1, control circuitry 16 modulates output transistors Q1 and Q2 to produce wireless signals 26 from coil 22 (see, e.g., signal Q1_gate, which is an illustrative signal of the type that may be applied to gate 46 of Q1). Period T1 may be, as an example, 5-20 ms in duration, more than 5 ms, less than 20 ms, or other suitable time period. During power transmission in period T1, transmitter circuit 18 may modulate the frequency of the signal applied to transistors Q1 and Q2 (e.g., to transmit FSK data to device 24). The FSK data may include a request for device 24 to respond (e.g., to provide an identifier, to provide charging parameters, etc.).

The power transmitted by coil 22 to coil 28 during period T1 is stored in capacitor Cout. As shown in FIG. 3, the DC voltage Vrect that is produced by rectifier 36 and that is stored across Cout ramps up during period T1. Voltage Vrect will increase in this way and energy will be stored in capacitor Cout even in the absence of stored energy in battery 42, allowing device 24 to transmit data to device 12 even if battery 42 is empty. Charger 44 may disconnect battery 42 during the ramping up of voltage Vrect.

After sufficient energy has been stored in capacitor Cout to power control circuitry 30, control circuitry 16 may cease modulation of transistors Q1 and Q2 and data transmitter 34 may begin transmitting data to data receiver 20. Data transmitter 34 may, for example, modulate the voltage at node N1. The output signal supplied to node N1 ($V_{N1}$) may have a set of pulses (e.g., three pulses in the example of FIG. 3) for each one bit and may be have an absence of pulses for each zero bit. In the illustrative configuration of FIG. 2, transmitter circuit 34 has a switch coupled to node N1 for modulating the signal on node N1. If desired, transmitter 34 may modulate the signal transmitted through coil 28 by applying pulses to the gate of transistor S1 and/or transistor S2 (as an example).

Each pulse from transmitter 34 induces ringing in the current flowing through coil 28. This ringing AC current produces AC wireless signals 26 that are received by coil 22 and converted into a ringing voltage Vsw in device 12. Data receiver 20 may monitor the signal Vsw and may demodulate Vsw to produce received data Dem_Code, as indicated by the bottom trace in the graph of FIG. 3.

Figure 4:
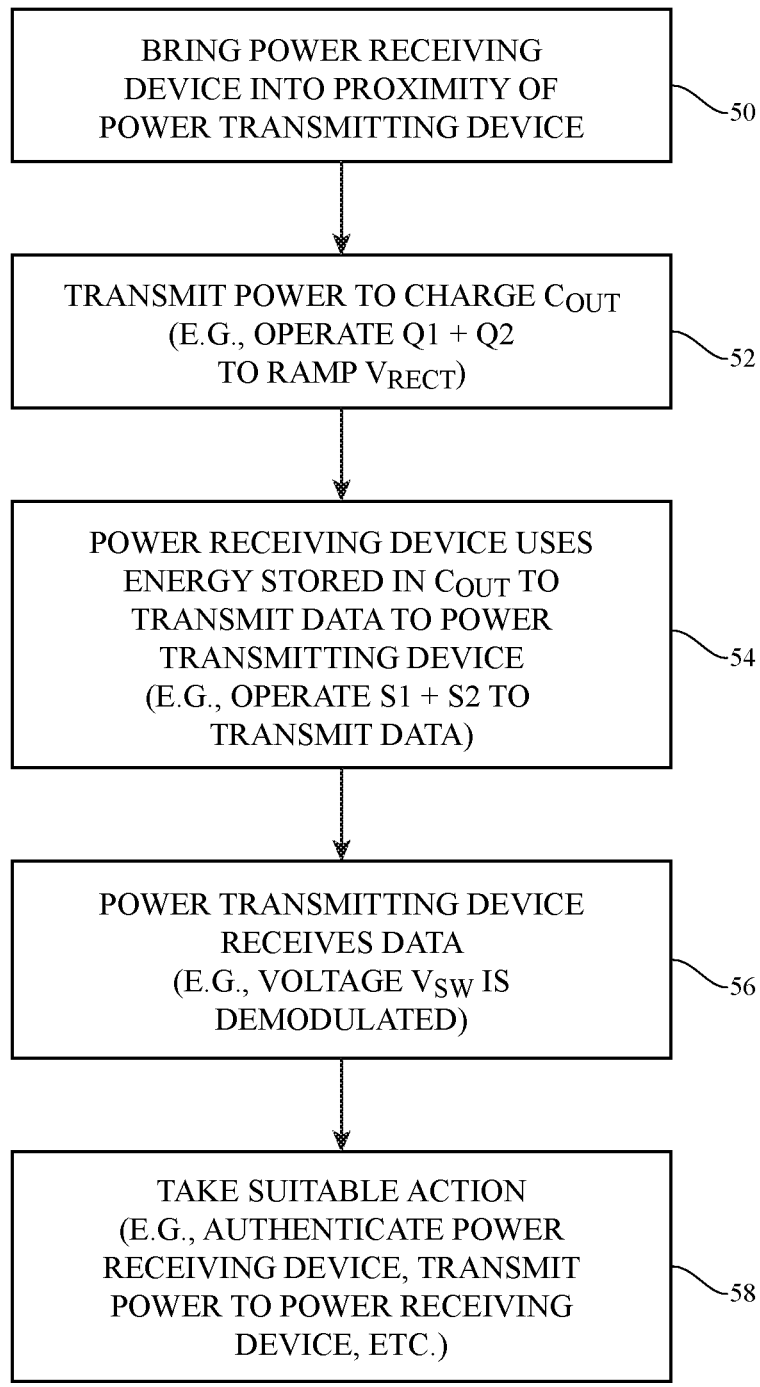
FIG. 4 is a flow chart of illustrative operations involved in using a wireless charging system in accordance with an embodiment.

A flow chart of illustrative operations involved in using system 10 to transmit power from device 12 to device 24 and to communicate data between devices 24 and 12 is shown in FIG. 4.

During the operations of block 50, a user of device 24 may bring device 24 into the vicinity of device 12. Device 12 may detect the presence of device 24 wirelessly (e.g., by making wireless impedance measurements, using a light-based proximity sensor, using a capacitive proximity sensor, or using other circuitry) or a user may activate a switch or other input device that informs device 12 that device 24 is available to receive wireless power.

During the operations of block 52, device 12 may transmit wireless power to device 24. The operations of block 52 may be initiated in response to user input to device 12 or in response detecting that device 24 is ready to receive wireless power using the sensor measurements or other measurements of block 50. For example, the operations of block 52 may be initiated by device 12 periodically (e.g., once per minute or other suitable time period), may be initiated in accordance with a predetermined schedule, or may be initiated in response to satisfaction of predetermined wireless power transmission initiation criteria. Wireless power may be transmitted from device 12 to device 24 by using control circuitry 16 to modulate transistors Q1 and Q2 to produce an AC drive signal through coil 22 and thereby produce a corresponding wireless signal 26 that is received by coil 28 in device 24. The power transmission operations of block 52 may last sufficiently long to charge up capacitor Cout to a level that allows the energy in capacitor Cout to power control circuitry 30, as illustrated by the ramped voltage Vrect in FIG. 3. During the operations of block 52, device 12 may send an FSK request to device 24 (e.g., a request that asks device 24 to supply a device identifier, charging parameters, and/or other information).

After device 12 energizes capacitor Cout and control circuitry 30 of device 24 in this way, device 12 may cease transmitting wireless power to device 24 (e.g., for a waiting period of about 20 ms, at least 5 ms, less than 50 ms, etc.) to allow device 24 to process the received FSK request and to allow device 24 to begin transmitting data to device 12 in response to the received request (block 54). While power transmission is stopped in this way and data is being transmitted to device 12, display 29 may display images uninterruptedly and/or other electrical components in device 24 may operate without interruption (e.g., without interruption from power loss). During the operations of block 54, data transmitter 34 of circuitry 30 may modulate the voltage $V_{N1}$ on node N1 using a switch coupled to ground and/or by modulating transistors S1 and S2 or other transmitter circuitry in device 24 (e.g., to produce sets of pulses of the type shown in FIG. 3) in accordance with the binary data stream being transmitted to device 12. During the operations of block 56, data receiver 20 may demodulate signal Vsw in device 12 (e.g., by using a zero-crossing detector to count zero transitions in the ringing signal Vsw or by otherwise detecting the ringing pulses induced by the pulses in $V_{N1}$ created by transmitter circuit 34 in device 24) and thereby receive the transmitted data stream. In general, any suitable data modulation scheme may be used in transmitting data from device 24 to device 12 using transistors S1 and S2 in bridge circuit 40 of rectifier 36. The illustrative configuration of FIG. 3 in which each set of three pulses applied to the gates of transistors S1 and S2 corresponds to a one bit and in which each comparable time period without pulses corresponds to a data zero bit is presented as an example.

Data transmission from device 24 to device 12 may be used to supply device 24 with feedback (e.g., information that directs device 24 to adjust its PWM output signal to increase or decrease the amount of wireless power being transmitted from device 12 to device 24), may be used to authenticate device 24 to device 12 (e.g., when device 24 is initially brought into the vicinity of device 12), or may be used to take other suitable action (block 58).

If desired, the operations of FIG. 4 may take place continuously or nearly continuously. For example, following authentication or power transmission level adjustments during the operations of block 58, processing may loop back to the operations of block 52, so that device 12 can repower device 24 and so that additional data may be transmitted from device 24 to device 12.

Figure 5:
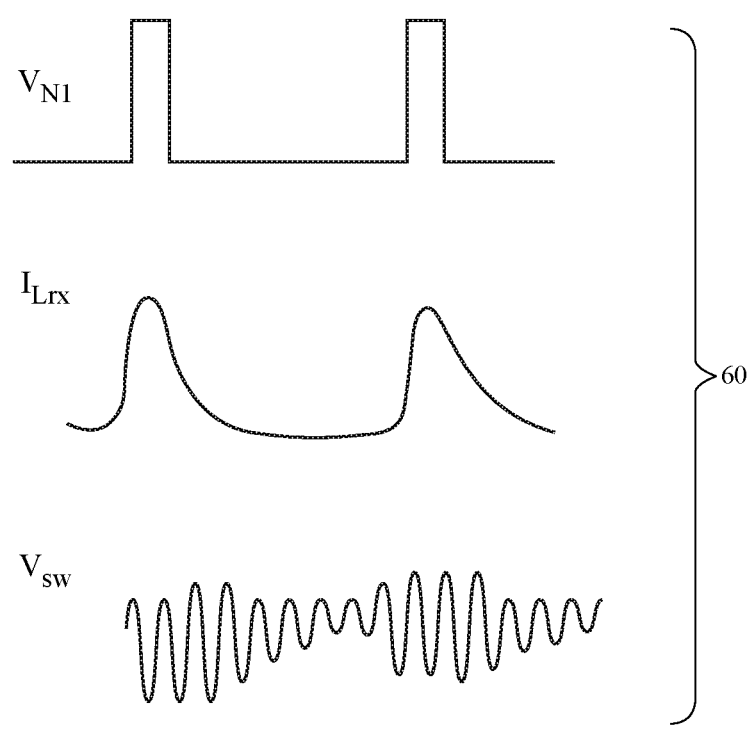
FIG. 5 is a graph of signals associated with transmitting data from a wireless power receiving device to a wireless power transmitting device in accordance with an embodiment.

FIG. 5 shows illustrative signals 60 associated with transmitting data from transmitter 34 to receiver 20. The uppermost trace of FIG. 5 corresponds to the ring-inducing pulses applied to node N1 of device 24 to node N1. There are three pulses per transmitted data bit (e.g., per "one" bit) in the present example, but fewer pulses or more pulses from transmitter 34 may be associated with each bit. Pulses in $V_{N1}$ produce corresponding current pulses in current $I_{Lrx}$ (the middle trace of FIG. 5) through coil 28 and result in ringing decaying pulses in Vsw (the lowermost trace in FIG. 5) in device 12 that are detected by receiver 20 in device 12 (e.g., each current pulse through coil 28 induces a corresponding ringing current pulse through coil 22 that is detected by receiver circuit 20).

The foregoing is merely illustrative and various modifications can be made to the described embodiments. The foregoing embodiments may be implemented individually or in any combination.

What is claimed is:

1. An electronic device configured to receive wirelessly transmitted power signals from a power transmitting device, comprising:
   a coil configured to receive the wirelessly transmitted power signals;
   a rectifier coupled to the coil, wherein the rectifier has transistors configured to rectify the power signals and produce a corresponding rectified direct-current voltage;
   a capacitor configured to be charged by the rectified direct-current voltage; and
   control circuitry having a data transmitter configured to transmit data to the power transmitting device by applying a series of current pulses to the coil using the transistors in the rectifier while the coil is not receiving the wirelessly transmitted power signals.

2. The electronic device of claim 1 wherein the transistors of the rectifier comprise first and second transistors coupled in series across the capacitor.

3. The electronic device of claim 2 further comprising an additional capacitor, wherein the first and second transistors are coupled at a node, wherein the additional capacitor is coupled to the node, and wherein the coil has a terminal coupled to the additional capacitor.

4. The electronic device of claim 2 further comprising first and second additional capacitors, wherein the first and second transistors are coupled at a node and wherein the first additional capacitor is coupled to the node and wherein the second additional capacitor is coupled to ground by a switch in the data transmitter.

5. The electronic device of claim 2 further comprising:
   a charger that is configured to receive the rectified direct-current voltage and that is configured to recharge a battery using the rectified direct-current voltage.

6. The electronic device of claim 1 wherein the control circuitry comprises a data receiver circuit configured to receive data through the coil that has been transmitted wirelessly from the power transmitting device while the coil is receiving the wirelessly transmitted power signals.

7. The electronic device of claim 1 wherein the data transmitter is configured to transmit data bits that are each represented by at least two of the pulses.

8. The electronic device of claim 1 further comprising a display that is configured to display images without interruption while the data transmitter transmits data to the power transmitting device.

9. A method for communicating between a wireless power receiving device and a wireless power transmitting device, comprising:
   with the wireless power receiving device, receiving transmitted wireless power from the wireless power transmitting device with a receiving device coil and a rectifier that has at least a pair of transistors coupled in series across a capacitor in the wireless power receiving device;
   with the wireless power receiving device, charging the capacitor in the wireless power receiving device using the received transmitted wireless power; and transmitting data to the wireless power transmitting device with a control circuit in the wireless power receiving device by applying signal pulses to the receiving device coil while wireless power transmission from the wireless power transmitting device is paused and while the capacitor is supplying power to the control circuit.

10. The method of claim 9 wherein transmitting the data comprises transmitting data to the wireless power transmitting device by applying current pulses to the receiving device coil that have a duration of 0.1 microseconds to 10 microseconds.

11. The method of claim 9 wherein transmitting the data to the wireless power transmitting device with the control circuit comprises transmitting the data to the wireless power transmitting device with the control circuit containing data bits that are each represented by at least two of the pulses.

12. The method of claim 9 further comprising:
with the wireless power transmitting device, transmitting the wireless power from a transmitting device coil.

13. The method of claim 12 further comprising:
with a data receiver in the wireless power transmitting device, receiving the transmitted data.

14. The method of claim 13 wherein each of the pulses induces a ringing signal in the transmitted device coil and wherein receiving the transmitted data comprises detecting the ringing signals.

15. The method of claim 9 wherein the wireless power receiving device comprises a display configured to display images, the method further comprising:
displaying the images uninterruptedly on the display while the wireless power transmission from the wireless power transmitting device is paused.

16. An electronic device that is configured to operate in a system with a wireless power transmitting device, comprising:
a coil that is configured to receive wireless power from the wireless power transmitting device;
a rectifier coupled to the coil;
a capacitor that is configured to be charged with wireless power received from the coil using the rectifier; and
a data transmitter configured to transmit data bits to the wireless power transmitting device while wireless power transmission by the wireless power transmitting device is paused by applying signal pulses to the coil that induce signal ringing in the wireless power transmitting device.

17. The electronic device of claim 16 wherein the transmitted data bits include data bits that are each represented by at least two of the signal pulses.

18. The electronic device of claim 17 wherein the data transmitter is configured to transmit the data bits by applying signal pulses to the coil that each have a duration of 0.1 to 10 microseconds.

19. The electronic device of claim 16 further comprising:
a battery; and
a charger that is configured to charge the battery with wireless power received from the wireless power transmitting device.

20. The electronic device of claim 16 further comprising an additional capacitor, wherein the additional capacitor is coupled between the coil and a node and wherein the data transmitter is configured to apply the signal pulses to the node.

21. The electronic device of claim 16 wherein the rectifier is configured to produce a direct-current rectified voltage in response to receipt of the wireless power and is configured to supply the direct-current rectified voltage to the capacitor.

22. The electronic device of claim 16 further comprising a display, wherein the display is configured to display images uninterruptedly while the wireless power transmission by the wireless power transmitting device is paused.

23. The electronic device of claim 16, wherein the signal ringing induced at the wireless power transmitting device is demodulated by the wireless power transmitting device to obtain a code corresponding to the data bits transmitted by the data transmitter.

* * * * *